US007890983B2

(12) United States Patent
Chen et al.

(10) Patent No.: US 7,890,983 B2
(45) Date of Patent: Feb. 15, 2011

(54) CHANNEL BUFFERING METHOD FOR DYNAMICALLY ALTERING CHANNEL NUMBER OF INTERNET PROTOCOL TELEVISION

(75) Inventors: Chung-Min Chen, Taipei (TW); Phone Lin, Taipei (TW); Chen-Kai Hsieh, Taipei (TW); Yun-Yin Huang, Taipei (TW)

(73) Assignee: Telcordia Applied Research Taiwan Company, Taipei (TW)

( * ) Notice: Subject to any disclaimer, the term of this patent is extended or adjusted under 35 U.S.C. 154(b) by 777 days.

(21) Appl. No.: 11/810,830

(22) Filed: Jun. 6, 2007

(65) Prior Publication Data

US 2007/0286224 A1    Dec. 13, 2007

Related U.S. Application Data

(60) Provisional application No. 60/812,551, filed on Jun. 9, 2006.

(51) Int. Cl.
*H04N 7/18* (2006.01)
(52) U.S. Cl. .................... 725/85; 725/142; 348/706; 348/731; 348/732
(58) Field of Classification Search ................ 348/731, 348/732, 734, 715, 705–706
See application file for complete search history.

(56) References Cited

U.S. PATENT DOCUMENTS 5,933,192 A * 8/1999 Crosby et al. ........ 375/240.25

| 6,208,271 B1 * | 3/2001 | Armstrong ............... 341/34 |
| 2001/0005905 A1 * | 6/2001 | Saib et al. .................. 725/57 |
| 2002/0113895 A1 * | 8/2002 | Takagi et al. ............. 348/569 |
| 2004/0133910 A1 * | 7/2004 | Gordon et al. ............. 725/37 |
| 2006/0075428 A1 * | 4/2006 | Farmer et al. ............. 725/38 |
| 2006/0230176 A1 * | 10/2006 | Dacosta .................... 709/235 |
| 2006/0277582 A1 * | 12/2006 | Kiiskinen et al. .......... 725/89 |

FOREIGN PATENT DOCUMENTS

JP    2000244284 A  *  9/2000

OTHER PUBLICATIONS

Translation of JP 2000 244284.*

* cited by examiner

*Primary Examiner*—Andrew Y Koenig
*Assistant Examiner*—Jason Chung
(74) *Attorney, Agent, or Firm*—Philip J. Feig (57) ABSTRACT

A channel buffering method is for dynamically altering a number of channels for an Internet protocol television (IPTV). The method is applicable for a home gateway (HG) having a channel section used for channel buffering. After the HG has received two consecutive channel-switching requests, the HG compares whether the two requests are similarly directed to switching a channel towards the same direction or not; if yes, a cumulative switching frequency is set, and two trimming numerical values are set through the cumulative switching frequency, and thus, the channel section for buffering the channels can be dynamically adjusted through the two trimming numerical values.

16 Claims, 6 Drawing Sheets

| Time | Operation | State | m | Channel Section |
|------|-----------|-------|---|-----------------|
| 0 | Turn on | | 0 | [10,12,14] |
| 30 | Channel plus 1 | Non-successive | 0 | [11,13,15] |
| 33 | Channel plus 1 | Successive | 0 | [12,14,16] |
| 36 | Channel plus 1 | Successive | 1 | [13,15,18] |
| 38 | Channel minus 1 | Inversely successive | 1 | [13,14,18] |
| 41 | Channel plus 1 | Inversely successive | 1 | [13,15,18] |
| 45 | Channel plus 1 | Successive | 2 | [15,16,22] |
| 46 | Channel plus 1 | Successive | 3 | [16,17,23] |
| 48 | Channel jumping | Non-successive | 0 | [63,65,67] |
| 108 | --- | Reduce | 0 | [64,65,66] |
| 168 | --- | Reduce | 0 | [64,65,66] |
| 170 | Channel plus 1 | Non-successive | 0 | [64,66,68] |
| ⋮ | | | | |

| Time | Operation | State | m | Channel Section |
|---|---|---|---|---|
| 0 | Turn on | | 0 | [10,12,14] |
| 30 | Channel plus 1 | Non-successive | 0 | [11,13,15] |
| 33 | Channel plus 1 | Successive | 0 | [12,14,16] |
| 36 | Channel plus 1 | Successive | 1 | [13,15,18] |
| 38 | Channel minus 1 | Inversely successive | 1 | [13,14,18] |
| 41 | Channel plus 1 | Inversely successive | 1 | [13,15,18] |
| 45 | Channel plus 1 | Successive | 2 | [15,16,22] |
| 46 | Channel plus 1 | Successive | 3 | [16,17,23] |
| 48 | Channel jumping | Non-successive | 0 | [63,65,67] |
| 108 | --- | Reduce | 0 | [64,65,66] |
| 168 | --- | Reduce | 0 | [64,65,66] |
| 170 | Channel plus 1 | Non-successive | 0 | [64,66,68] |
| ... | | | | |

CHANNEL BUFFERING METHOD FOR DYNAMICALLY ALTERING CHANNEL NUMBER OF INTERNET PROTOCOL TELEVISION

CROSS-REFERENCE TO RELATED APPLICATIONS

This application claims the benefit of U.S. Provisional Patent Application No. 60/812,551, filed Jun. 9, 2006, which is hereby incorporated herein by reference in its entirety.

BACKGROUND OF THE INVENTION

1. Field of Invention

The present invention relates to a channel buffering method of Internet protocol television (IPTV). More particularly, the present invention relates to a channel buffering method for dynamically altering number of IPTV channels through two trimming numerical values.

2. Related Art

The IPTV is a service that broadcasts multiple TV channels to the digital television through an IP (Internet Protocol) network. In the present invention, the term of digital television is used to represent any equipment or equipment assembly that is capable to receive digital channels and displayed them on the TV screen, such as a digital TV or an assembly of a set-top box (STB) with a TV set. The largest difference between the IPTV and the current wireless/cable television lies in that, the wireless/cable television transports all the channels, but the IPTV only transfers a limited number of channels to the digital television. Therefore, when the user selects his or her favorite channel from all the channels provided by the IPTV headend, the IPTV headend would only transfer the selected channel to the digital television in the user's house. In this way, the user will not encounter unselected channels, so as to save the bandwidth occupied for transmitting the unselected channels over the network.

Figure 1:
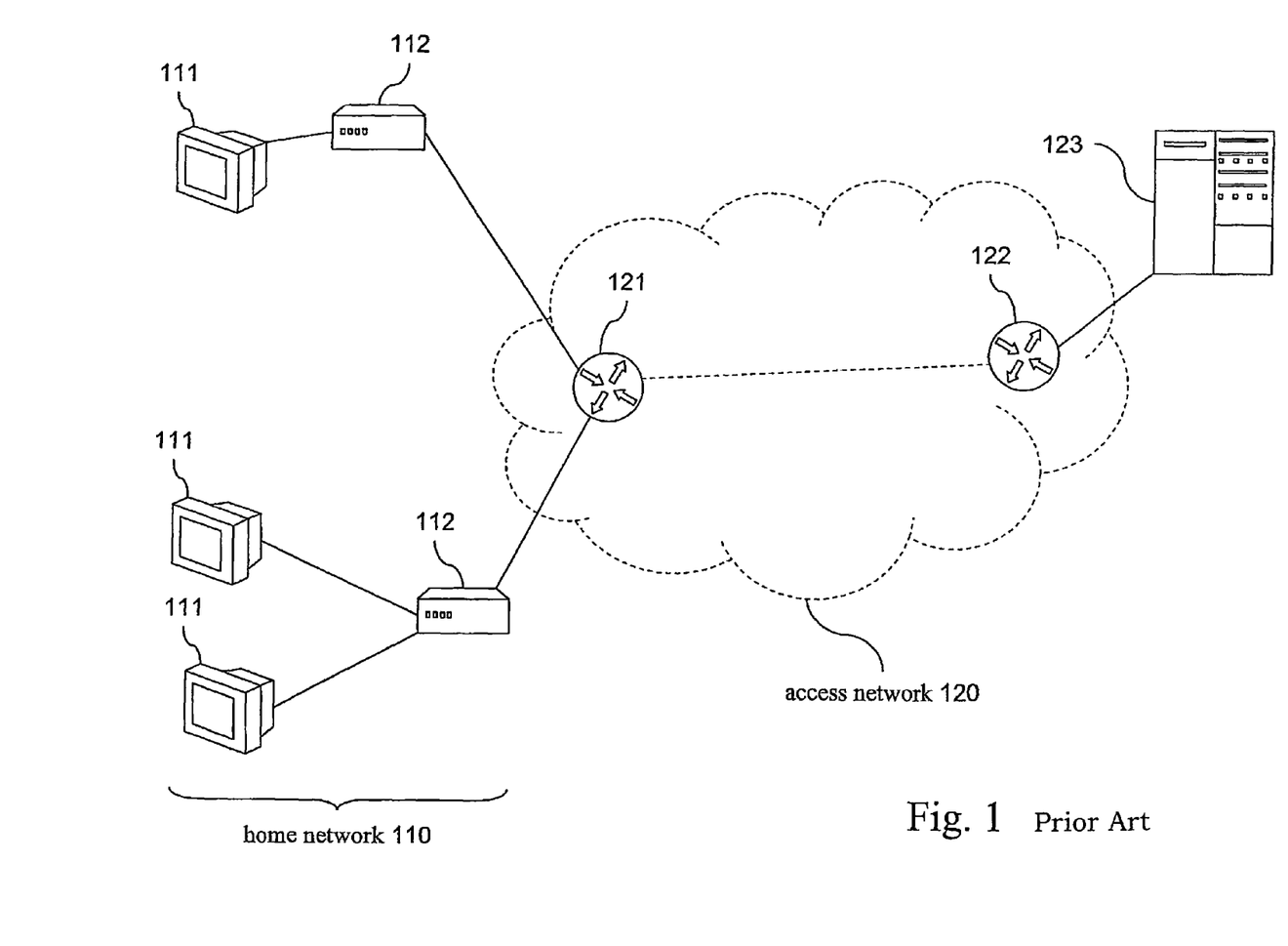
FIG. 1 is a network architecture view of a conventional IPTV.

When the user switches the TV channel, the digital television sends a request for receiving the new channel. Once the IPTV headend receives the request for receiving the new channel, it delivers the new channel to the digital television over Internet. A zap time refers to the time duration from sending the request by the digital television to receiving the new channel. For the user's point of view, if the zap time is shorter, he or she spends less time for switching to the new channel. Statistics shows that, the user may feel uncomfortable after waiting for longer than 1.5 seconds. Therefore, in order to avoid the situation that the user may feel the time waiting for switching to the new channel is too long, some manufacturers begin to think about how to shorten the zap time. Currently, a process of shortening the zap time is proposed, in which a plurality of channels is buffered on a home gateway (HG) 112. The digital television 111 is connected with the HG 112, and the HG 112 communicates with the IPTV headend 123 over the access network 120 (i.e., Internet herein), as shown in FIG. 1. If the user switches the channel to a channel buffered in the HG 112, the HG 112 directly delivers the channel to the digital television 111, without requiring the IPTV headend 123 for redelivery, such that the time for delivering the channel from the IPTV headend 123 to the HG 112 is omitted from the zap time.

Buffering the channel in the HG 112 can shorten the zap time, so it is very important whether the channel switched by the user is buffered on the HG 112. However, in the current solution of HG 112, the numbers of forward and backward buffered channel are fixed. The function of dynamically adjusting the size of the buffered channel section does not exist. That is to say, when the user switches the channel quickly, due to the excessive long delay time for delivering the channel over the access network (Internet) 120, the HG 112 generally cannot receive the user's desirable channels on time, which means the delay time for the channel switching is too long. Therefore, how to provide a method of dynamically adjusting the number of channel buffering so that the channel can be buffered before user quickly switches to it is still an urgent problem to be solved by the IPTV service providers and the users.

SUMMARY OF THE INVENTION

In view of the above problems, the present invention is directed to a method of dynamically altering the number of buffered channel to reduce a zap time. If two channel-switching requests are received within a constant threshold time with same direction, the channel section for the buffered channels is adjusted, such that the function of dynamically adjusting the channel section is achieved, thereby solving the problems of the prior art.

In order to achieve the above objective, the method provided by the present invention includes the following steps: setting a first initial channel buffering number d0, a second initial channel buffering number u0, a display channel p, and a constant threshold time; set the channel section from p−d0 to p+u0. Calculate the time interval between the first and second channel-switching requests. If the time interval is smaller than or equal to the constant threshold time, and the first channel-switching request and the second channel-switching request are both change towards the same direction, set a cumulative switching frequency. Use this frequency to set a first trimming numerical value $w_1$ or a second trimming numerical value $w_2$. Then, alter the channel section as from p−d0+$w_1$ to p+u0+$w_2$, and buffer a plurality of channels contained in the channel section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

FIG. 1 shows an architecture view of the current IPTV, which is mainly divided into two parts: one is an access network 120, and the other is a home network 110.

In the access network 120, an IPTV headend 123 broadcasts multiple streams to a first hop router (FHR) 122, and then, the FHR 122 then routes the streams to downstream nodes through an IP multicast protocol. If the node is a router, each stream is similarly routed through an IP multicast protocol until reaching a last hop router (LHR) 121. The LHR 121 is the router that is closest to the home network 110, which delivers the received channels to an HG 112 in the home network 110.

Figures 2A, 2B:
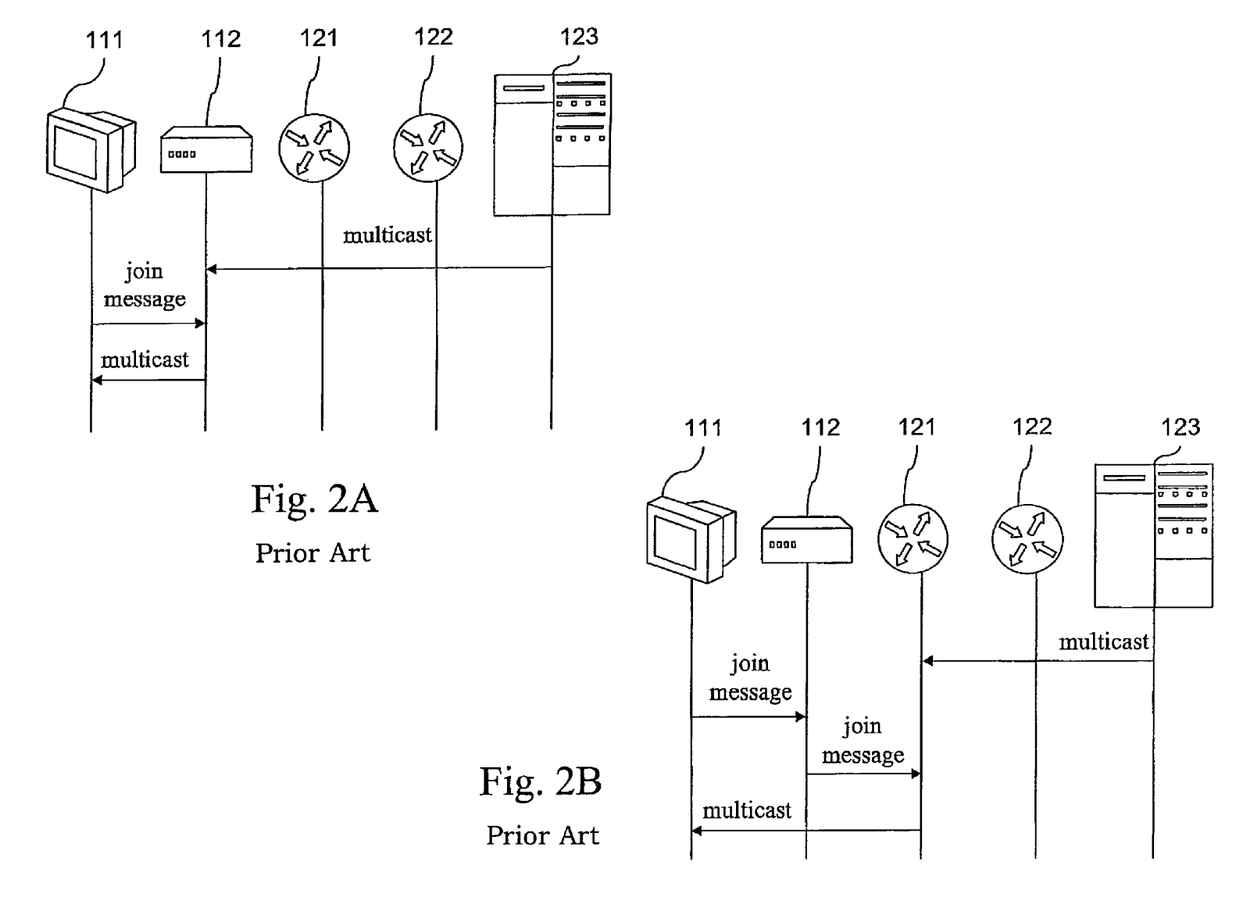
FIG. 2A is a schematic view of a channel switching delay of the conventional IPTV.
FIG. 2B is another schematic view of a channel switching delay of the conventional IPTV.
Figure 2C:
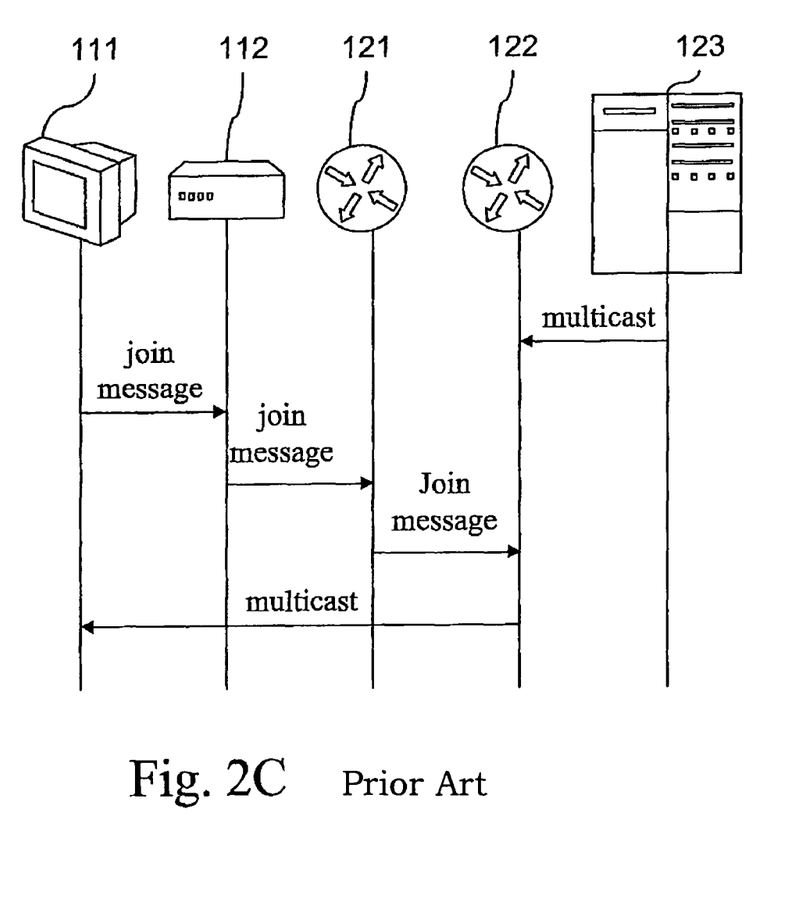
FIG. 2C is still another schematic view of a channel switching delay of the conventional IPTV.

The home network 110 contains two major nodes: home gateway (HG) 112 and a digital television 111. The digital television 111 sends the first channel-switching request to the HG 112 through an Internet group management protocol (IGMP) join message. After receiving the first channel-switching request, the HG 112 would determine whether a requested channel has been downloaded. If other digital televisions are viewing this channel, the requested channel have already been buffered in the HG 112, so the HG may directly deliver the requested channel to the digital television 111, as shown in FIG. 2A. If the requested channel is not buffered in the HG 112, the HG 112 would send out a channel download request to the LHR 121 through an IGMP join message. Once the LHR 121, with requested channel buffered, receives the channel request, it delivers the requested channel to the HG 112. After the HG 112 has received the requested channel, it then routes the requested channel to the digital television 111, as shown in FIG. 2B. If the channels received by the LHR 121 do not include the requested channel, the LHR 121 sends out a connection request to the upstream router via a protocol independent multicast (PIM) join message to download the requested channel. The worst situation is that, those upstream routers do not receive the requested channel, the connection request is continuously delivered by each router to the upstream router thereof, until it is delivered to the FHR 122. The FHR 122 has all the channels, so the FHR 122 is definitely capable of delivering the channel to the downstream router, and thus, the connection request will not further delivered after being delivered to the FHR 122. As shown in FIG. 2C, if the upstream router receives the requested channel, the upstream router may deliver the requested channel to the downstream routers by means of multicasting till the LHR 121. After the LHR 121 has received the requested channel, it delivers the requested channel to the HG 112 by means of multicasting, and then, the HG 112 further delivers the requested channel to the digital televisions 111 by means of multicasting.

In the following descriptions, the words "previous", "next", and "direction" are mentioned. The "previous" represents that the number is relatively small, and the "next" represents that the number is relatively large. In the present invention, the "direction" only includes two circumstances: "forward" and "backward", in which the "forward" represents that the number becomes increasingly large, and the "backward" represents that the number becomes increasingly small.

Figure 3:
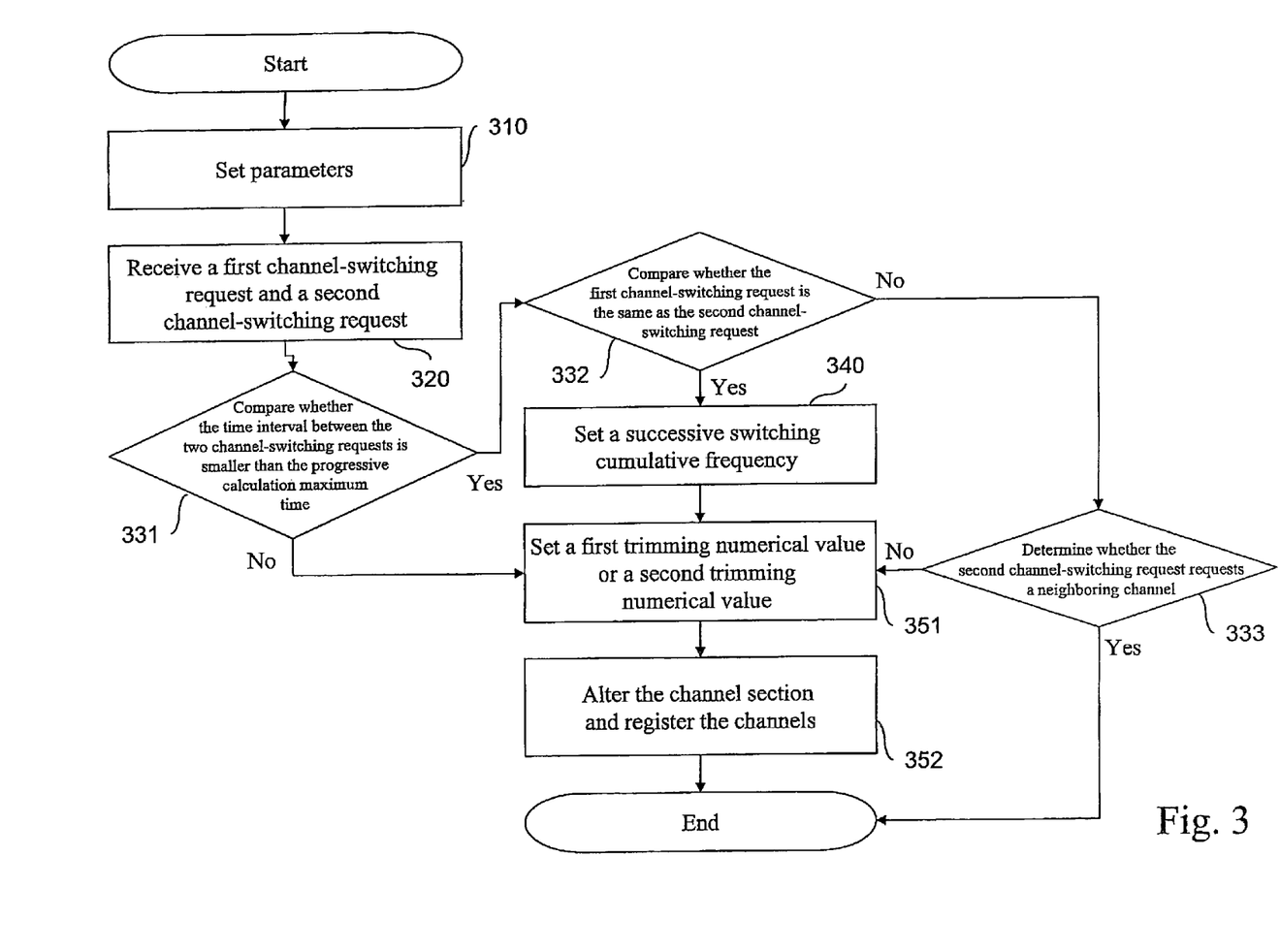
FIG. 3 is a flow chart of a channel registration method for dynamically altering a channel number of the IPTV according to the present invention.
Figure 4:
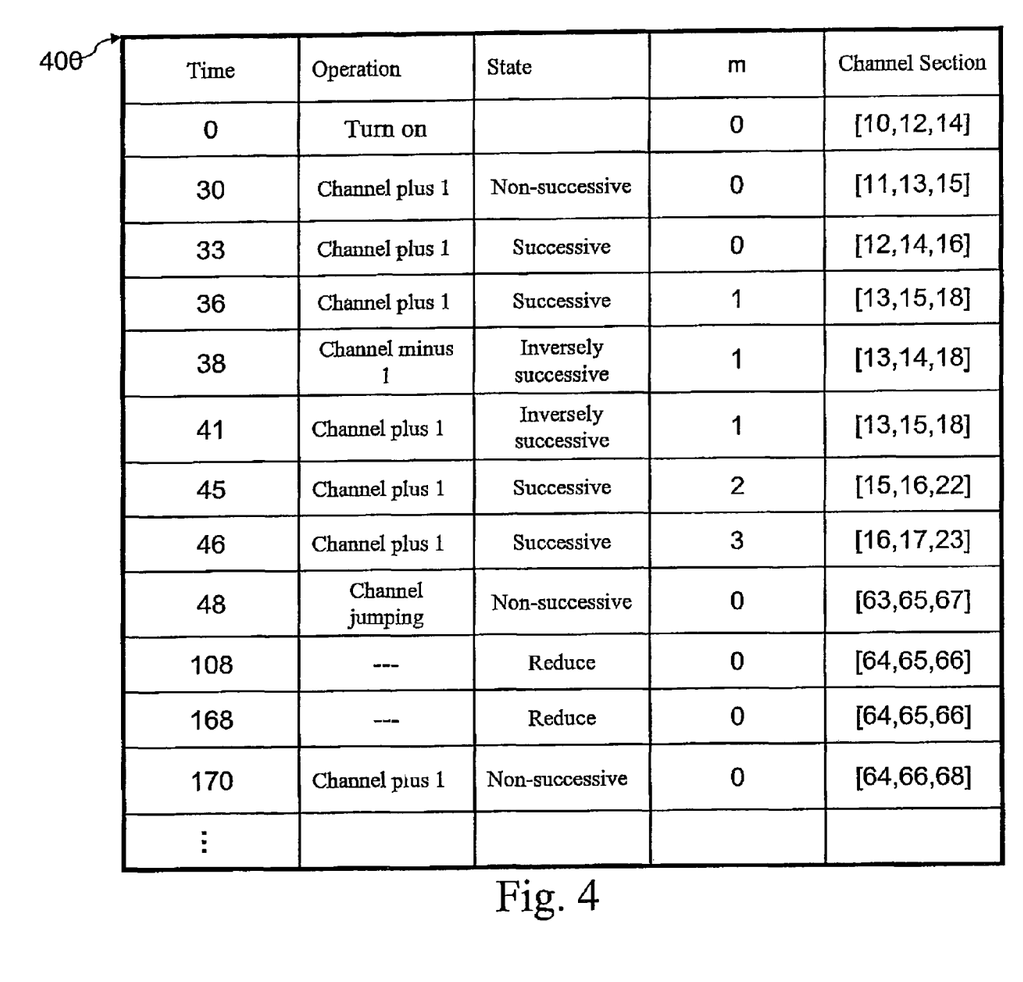
FIG. 4 is a timing table of the channel switching according to an embodiment of the present invention.

Next, an embodiment is described below to illustrate the system execution and method of the present invention. In this embodiment, switching a channel backward is taken as an example, and the principle for switching the channel forward is the same as that for switching the channel backward, which thus will not be further described through another embodiment. In this embodiment, the constant threshold time is, for example, 5 seconds, but which is not limited to 5 seconds in the present invention. Meanwhile, referring to FIGS. 3 and 4, FIG. 3 is a flow chart of the channel registration method for dynamically altering the channel number of the IPTV, and FIG. 4 is a timing table of the user's operations according to the embodiment of the present invention.

Once the user turns on the digital television, that is, the time on the timing table 400 is 0, the digital television 111 sends the "turn on" signal to the HG 112 where the constant threshold time is set as 5 seconds.

After the HG 112 has received the "turn on" signal, the channel when the user turned off the TV last time is sent to the digital television 111, and set as display channel p. Meanwhile, the HG 112 reads a default value of the first channel buffering number d and the second channel buffering number u. The first channel buffering number d and the second channel buffering number u are the number of channels additionally downloaded and buffered by the HG 112. The HG 112 then additionally buffers the previous d channels neighboring the display channel p and the next u channels neighboring the display channel p. That is, the channel downloaded by the HG 112 is not merely the display channel p delivered to the digital television 111, but includes one channel section containing a plurality of channels, including the display channel p. The scope of the channel section is from p−d channel to p+u channel (Step 310). For example, p=12, d=2, and u=2 are used to indicate that the channel delivered by the HG 112 to the digital television 111 is channel 12, and the HG additionally downloads two channels 10 and 11 (d=2) before the channel 12 and two channels 13 and 14 (u=2) after the channel 12, and buffers the channels 10, 11, 13, and 14 therein. In the present invention, a symbol [D, U] represents that the channel section buffered by the HG 112 is from a channel D to a channel U. Alternatively, a symbol [D, C, U] represents that the channel section buffered by the HG 112 is from the channel D to the channel U, and a channel C is delivered to the digital television 111 for being played. As known from the above description that, D=p−d and U=p+u. In this embodiment, when the digital television 111 is turned on, D=p−d=12−2=10, U=p+u=12+2=14, and C=p=12, that is, when the HG 112 has received the turn on signal of the digital television 111, the buffered channel section is [10, 14].

After the HG 112 has finished setting each parameter (such as the display channel p and the channel section), if the channels contained in the channel section is not buffered in the HG 112 yet, the HG 112 would send a join message to the LHR 121. Then, the LHR 121 would deliver the channels to the HG 112 as the manner shown in FIGS. 2B and 2C. After receiving the channels required to be buffered, the HG 112 transmits the display channel p to the digital television 111 for display, and buffers the remaining channels, which thus reduces the zap time when the digital television is quickly and successively switched to the previous or next channel.

There are four different states after the user switches the channel of the digital television 111. The first one is that the time interval between these two continuous channel switching falls within the constant threshold time, and the directions of the two channel switching are the same, which is called "successively channel switching" in the present invention. The second one is that the time interval falls within the constant threshold time, but the directions of the two channel switching are opposite. For example, the user first chooses the next channel, and then switches back to the previous channel within the constant threshold time, which is called "successively channel reverse" in the present invention. The third one is that the user directly presses a channel number of the desired channel, which is called "channel jump" in the present invention. Any circumstance that does not belong to the above three states is the last state, which is called "non-successively channel switching" in the present invention. For example, the time between the two consecutive switches exceeds the constant threshold time. The above-mentioned "directions are the same" means that the directions of both the two channel switching are forward or backward, and the "directions are opposite" means that one of the directions for the two channel switching is forward, and the other is backward. The following descriptions are similar to that mentioned above. The channel buffering processes of the present invention corresponding to the above four states are illustrated below.

As shown in FIG. 4, when the user switches to the next channel at the $30^{th}$ second, the digital television 111 sends out a third channel-switching request of "the next channel" (that is, the requested channel is channel (p+1)) to the HG 112. After receiving the third channel-switching request, the HG 112 determines the time interval between the two consecutive channel-switching requests. In this embodiment, it is the first time the user switches to the desired channel after turning on the digital television 111, so the receiving time of the previous channel-switching request does not exist, which corresponds to the state of "non-successively channel switching". Then, the HG 112 delivers the next channel (channel (p+1)) of the display channel p to the digital television 111, such that the channel played by the digital television 111 is changed from channel 12 to channel 13. When the new channel is delivered to the digital television 111, the HG 112 sets the new display channel p as p+1 (p=p+1), and the buffered channel section is altered. In the process of channel section alternation, two important parameters are included, which are the first trimming numerical value $w_1$ and the second trimming numerical value $w_2$. The two parameters affect the channels buffered by the HG 112. Therefore, when the display channel delivered by the HG 112 to the digital television 111 is changed from p to p+1, the downloaded channel section is changed to [p−d+$w_1$, p+u+$w_2$]. In this embodiment, under the state of "non-successively channel switching", the first trimming numerical value $w_1$ and the second trimming numerical value $w_2$ are fixed to be 1 ($w_1$=$w_2$=1). However, the first channel buffering number d and the second channel buffering number u set by the HG 112 are 2 (d=u=2), so when the HG 112 receives the request for changing the delivered channel from the channel 12 to the channel 13 from the digital television 111, the HG 112 changes the buffering channel section from [p−d, p+u] to [p−d+$w_1$, p+1, p+u+$w_2$], that is, from the original [10, 12, 14] to [11, 13, 15], and then, updates the display channel p to the channel 13, that is, setting the display channel p as p+1.

After the user switches to the next channel at the $33^{th}$ second which sends out a fourth channel-switching request, the HG 112 would receive the fourth channel-switching request (Step 320). Then it determines whether the time between the three and fourth channel switching falls within five seconds, the constant threshold time (Step 331). Since the time of the previous channel switching done by the user is at the $30^{th}$ second, so the time between the two neighboring channel switching is within 5 seconds. Then, the HG 112 compares whether the third channel-switching request and the fourth channel-switching request are the same (Step 332). Since the third channel-switching request and the fourth channel-switching request are both "delivering the next channel", apparently, the directions the third channel-switching request and the fourth channel-switching request are the same, and these two requests are both for switching one channel, so the determination is true, for the state of "successively channel switching". Therefore, the HG 112 would set the cumulative switching frequency as the frequency for entering the state of "successively channel switching" (Step 340). Then the HG 112 sets the first trimming numerical value $w_1$ according to a pre-stored first channel trimming rule, and sets the second trimming numerical value $w_2$ according to a pre-stored second channel trimming rule. In this embodiment, the first channel trimming rule fixedly sets $w_1$ as 1 ($w_1$=1); the second channel trimming rule presets a parameter, the cumulative switching frequency m, as 0 (m=0), then sets $w_2$ as $2^m$ ($w_2$=$2^m$), and then adds 1 to the cumulative switching frequency m (m=m+1). However, the first channel trimming rule and the second channel trimming rule mentioned in the present invention are not limited to the above two rules. At this time, it enters the state of "successively channel switching" for the first time after the user turns on the digital television 111, so the first trimming numerical value $w_1$ is 1 ($w_1$=1), and the second trimming numerical value $w_2$=$2^m$=$2^0$=1 (Step 351), and thus, the channel section buffered by the HG 112 is changed from the original [11, 13, 15] to [12, 14, 16] ([p−d+$w_1$, p+1, p+u+$w_2$], p=13, d=u=2, $w_1$=1, $w_2$=1) (Step 352). The channel delivered to the digital television 111 for being played is changed from channel 13 to channel 14, since the user switches the channel to the next channel.

When the user switches to the next channel at the $36^{th}$ second to send out a fifth channel-switching request (Step 320), the time from the previous channel switching done by the user (the $33^{rd}$ second) is within 5 seconds, the constant threshold time (Step 331). After the HG 112 has received the fifth channel-switching request, it determines whether the fifth channel-switching request and the fourth channel-switching request are the same (Step 332), and thus, it enters the state of "successively channel switching" for the second time. In this way, the HG 112 sets the first trimming numerical value $w_1$ as 1 ($w_1$=1) according to the first channel trimming rule, the second trimming numerical value $w_2$ according to the second channel trimming rule, and the cumulative switching frequency m as 2 (Step 340). In the state of "successively channel switching" for the first time, the cumulative switching frequency m is set as 1, so the second trimming numerical value $w_2$=$2^m$=$2^1$=2 (Step 351). Therefore, when the display channel delivered by the HG 112 to the digital television 111 is changed from channel 14 to channel 15, the buffering channel section is altered from [12, 14, 16] to [13, 15, 18] ([p−d+$w_1$, p+1, p+u+$w_2$], p=14, d=u=2, $w_1$=1, $w_2$=2) (Step 352).

In this manner, if the user successively switches the played channel to the next channel, more and more channels behind the display channel p are buffered in the HG 112. When the user successively switches backward for one channel, the channel number of the display channel delivered by the HG 112 to the digital television 111 for being played would be gradually increased backward. Since that, several backward channels are already buffered in the HG 112, which prevents the circumstance that the switched channels are not buffered in the HG 112. The present invention can solve the problem of the prior art that the zap time is excessively long.

Next, if the user presses the key to switch the channel to the previous channel at the $38^{th}$ second, a sixth channel-switching request of "delivering the previous channel" is sent out, that is, the requested channel is channel p−1. After receiving the sixth channel-switching request, the HG 112 determines that the time from the previous channel switching done by the user is 2 seconds (Step 331), which falls within 5 seconds, the constant threshold time. However, when it is determined whether the sixth channel-switching request is the same as the fifth channel-switching request of "delivering the next channel", it is determined that the directions for switching the channels requested by the sixth channel-switching request and the fifth channel-switching request are different (Step 332). Then it is further determined whether the sixth channel-switching request requests a neighboring channel or not (Step 333). At this time, since the channel requested by the sixth channel-switching request is the previous channel, the above determination is true, which enters the state of "successively channel reverse". Under this state, both the first trimming numerical value $w_1$ and the second trimming numerical value $w_2$ are not changed, so the downloaded channel number is not changed, and meanwhile, the channel section buffered by the HG 112 is still not changed. Since the display channel p is switched to the previous channel, the display channel p is changed to p−1 (p=p−1), that is, from channel 15 to channel 14. Therefore, although the channel section buffered by the HG 112 maintains at [13, 18], the display channel delivered to the digital television 111 is changed to the channel 14.

When the user presses the key to switch the channel to the next channel at the 41$^{th}$ second, a seventh channel-switching request of "delivering the next channel" is sent out, that is, the requested channel is channel p+1. After the HG 112 has received the seventh channel-switching request, it determines that the time from the previous channel switching done by the user is 3 seconds (Step 331), which falls within the 5 seconds, the constant threshold time. However, when it is determined whether the seventh channel-switching request is the same as the sixth channel-switching request of "delivering the next channel", it is determined that the directions for switching the channels requested by the seventh channel-switching request and the sixth channel-switching request are different (Step 332), but it is further determined whether the seventh channel-switching request requests a neighboring channel (Step 333). Since the channel requested by the seventh channel-switching request is the next channel, the determination is true, and thus, the state of "successively channel reverse" is occurred. Therefore, the first trimming numerical value $w_1$ and the second trimming numerical value $w_2$ are still not changed (the channel number downloaded by the HG 112 is not changed). The display channel p is switched to the next channel, so the display channel p is changed from the channel 14 to the channel 15 (p=p+1), such that the channel section buffered by the HG 112 is changed from [13, 14, 18] to [13, 15, 18].

In addition, it is easily found in the above process of "successively channel switching" that, the second trimming numerical value $w_2$ increases as the numerical value m continuously increases, such that the channel number downloaded by the HG 112 is gradually increased, and thus, the overuse of the bandwidth may occur. Therefore, the HG 112 needs to set a parameter, a maximum channel buffering number $N_b$, to limit the size of the buffered channel section. In this way, the channel number $((p+u+w_2)-(p-d+w_1)+1=u+d-w_1+w_2+1)$ contained in the channel section should not exceed the maximum channel buffering number $N_b$ $(u+d-w_1+w_2+1 \leq N_b)$. When the display channel is switched from p to (p+1), a new display channel (p+1) must fall within the channel section to make the channel section as $[p-d+w_1, p+1, p+u+w_2]$. Since the first channel buffering number d and the second channel buffering number u are fixed values, and the second trimming numerical value $w_2$ has been gradually decreased to make the backward channel buffering number $((p+u+w_2)-(p+1)=u+w_2-1)$ become increasingly large, in order to make the channel section not exceed the maximum channel buffering number $N_b$, it is necessary to relatively reduce the number of forward buffering channels $((p+1)-(p-d+w_1)=d-w_1+1)$, that is, to increase the first trimming numerical value $w_1$. However, in order to prevent the forward channel buffering number from being 0, it is necessary to predefine the least channel number h, such that the HG 112 at least buffers the forward h channels $(h \geq d-w_1+1)$.

Figure 5:
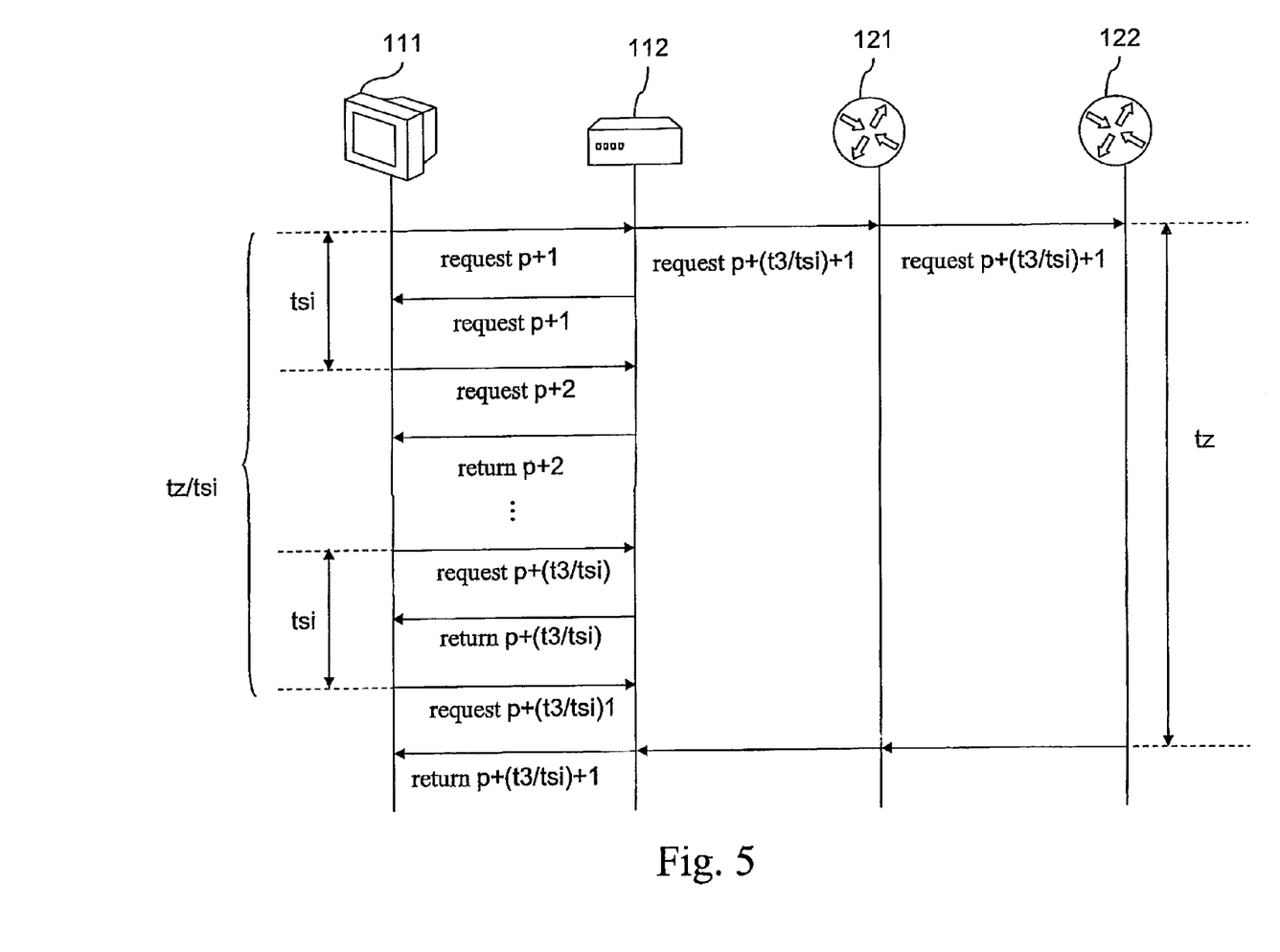
FIG. 5 is a timing chart of the channel-switching request according to the present invention.

Generally, the maximum channel buffering number $N_b$ may be set at random. However, if the maximum channel buffering number $N_b$ is excessively large, some bandwidth will be wasted. Therefore, the maximum channel buffering number $N_b$ has a calculable recommended value, that is, the recommended maximum channel number $U_b$. Before the recommended maximum channel number $U_b$ is calculated, it is necessary to firstly define a delay time $t_z$ and an average zap time $t_{si}$. As shown in FIG. 5, the delay time $t_z$ is the total time after the digital television 111 sends out the channel-switching request to the HG 112, and then the HG 112 forwards the channel download request to FHR 122, to the requested channel be transmitted from the FHR 122 to the digital television 111, through the LHR 121 and the HG 112; the average zap time $t_{si}$ is the average time for the digital television 111 to successively send out the request for switching to the next neighboring channel buffered in HG 112. Consider the case that channel number buffered by the HG 112 already matches the recommended maximum channel number $U_b$, and the forward channel buffering number in the HG 112 satisfies the least channel number h. When the user switches the display channel from p to (p+1), as for the channel section ([p−h, p, p−h+$U_b$−1]) buffered by the HG 112, the forward channel buffering number cannot be further reduced, so the backward channel buffering number cannot be further increased. Therefore, the channel section buffered by the HG 112 only shifts for one channel, which is changed to [p+1−h, p+1, p+1−h+$U_b$−1], which means the last channel downloaded by the HG 112 is changed from (p−h+$U_b$−1) to (p+1−h+$U_b$−1). Since the HG 112 does not buffer the channel (p+1−h+$U_b$−1), so it is necessary for the HG 112 to send out a request for downloading the channel (p+1−h+$U_b$−1) to the LHR 121. When the user successively presses the key for $U_b$ times to switch to the next channel, the channel is switched for $U_b$ times, that is, the display channel will be changed from p to (p+$U_b$). The time required by this process approaches to the recommended maximum channel number $U_b$ multiplied by the average zap time $t_{si}$ ($U_b \times t_{si}$). If it is intended to make the user's waiting time for switching the channel (p+$U_b$) to the channel (p+$U_b$+1) be equal to the waiting time for switching the channel p to the channel (p+1), after the digital television 111 sends out the channel-switching request, the average delay time $t_z$ for delivering the channel from the FHR 122 to the digital television 111 must be smaller than or equal to the recommended maximum channel number $U_b$ multiplied by the average zap time $t_{si}$ ($t_z \leq U_b \times t_{si}$), so the recommended maximum channel number $U_b$ is at least $t_z/t_{si}$ ($U_b \geq t_z/t_{si}$). Similarly, if the user successively switches forward for one channel, according to the above calculation result, the recommended maximum channel number $U_b$ would also at least be $t_z/t_{si}$. Through the above calculation, it can be known that, if the maximum channel buffering number $N_b$ is too small, the time (the delay time $t_z$) required for downloading the channel remains too long for the HG 112 to buffer the channel.

After the HG 112 has set the maximum channel buffering number $N_b$, it limits the channel buffering number $((p+u+w_2)-(p-d+w_1)+1=u+d-w_1+w_2+1)$ within the maximum channel buffering number $N_b$ $(u+d-w_1+w_2+1 \leq N_b)$. Therefore, in order to prevent the second trimming numerical value $w_2$ from being too large while the user successively switching backward for a channel, which means the channel number buffered by the HG 112 be gradually increased so that the channel buffering number becomes larger than the maximum channel buffering number $N_b$, the present invention has two corresponding processing methods. If the display channel is changed from p to (p+1), and the channel number (p+u+w2) of the last channel required to be buffered by the HG 112 is larger than or equal to the value of $p-h+N_b-1$ ($p+u+w_2 \geq p-h+N_b-1$), it indicates that the second trimming numerical value $W_2$ is over-increased, which causes the backward channel buffering number $((p+u+w_2)-(p+1)=u+w_2-1)$ to be excessively large. As a result, the channel number buffered by the HG 112 exceeds the maximum channel buffering number $N_b$. If the user continuously and successively switches backward for one channel, theoretically, the forward channel buffering number should be reduced and the backward channel buffering number should be increased. However, if the backward channel buffering number is not reduced, but merely the forward channel buffering number $((p+1)-(p-d+w_1)=d-w_1+1)$ is reduced, since the forward channel buffering number must satisfy the minimum channel number h ($d-w_1+1 \geq h$), the forward channel buffering number is reduced to the minimum channel number ($d-w_1+1=h$), and accordingly, the total channel buffering number is changed from ($u+d-w_1+w_2+1$) to ($u+w_2+h$). As known from the initially set condition ($p+u+w_2 \geq p-h+N_b-1$), the channel number buffered by the HG 112 still exceeds the maximum channel number $N_b$ ($(p+u+w_2)+h \geq (p-h+N_b-1)+h+1=p+N_b$, so $u+w_2+h \geq N_b$), so it is necessary to reduce the backward channel buffering number $((p+u+w_2)-(p+1)=u+w_2-1)$, that is, to reduce the second trimming numerical value $w_2$ to make the total channel buffering number at most be equal to the maximum channel number $N_b$, which is the first processing method. The second processing method is suitable for the circumstance that the initially set condition is false, that is, the channel number ($p+u+w_2$) of the last channel required to be buffered is smaller than $p-h+N_b-1$ ($p+u+w_2 < p-h+N_b-1$, that is, $u+h+w_2 < N_b$). It indicates that the channel number buffered by the HG 112 can satisfy the maximum channel buffering number $N_b$, without reducing the forward channel buffering number to the least channel number h. Thus, it is not necessary to change the backward channel buffering number $((p+u+w_2)-(p+1)=u+w_2-1)$, but merely reduce the forward channel buffering number $((p+1)-(p-d+w_1)=d-w_1+1)$ to ($u+w_2-N_b$), such that the channel buffering number matches the maximum channel number $N_b$ ($u+d-w_1+w_2+1 < N_b$). In this embodiment, if the simultaneously download channel number $N_b$ is 8 and the at least channel number h is 1, when the user switches backward for one channel at the 45$^{th}$ second, this channel switching is 4 seconds from the previous channel switching, and both the switching are switched backward for one channel, which thus enters the state of the third "successively channel switching". At this time, the cumulative switching frequency m is 2, so the first trimming numerical value $w_1=1$, and the second trimming numerical value $w_2=2^m=2^2=4$. Therefore, the predetermined channel section required to be downloaded for the HG 112 is changed from [13, 15, 18] to [14, 16, 22]. However, the buffered channel section includes 9 channel numbers, which is larger than the simultaneously download channel number $N_b$ of 8, so it is necessary to reduce the buffered channel section. The last channel to be buffered is channel 22, the first channel to be buffered is channel 14, so the last channel to be buffered is smaller than or equal to the first channel to be buffered plus the maximum channel buffering number $N_b$ minus 1 ($22=p+u+w_2 \leq p-h+N_b-1=16-1+8-1=22$). Therefore, the second processing method is applicable for this circumstance, and particularly, reducing the forward channel buffering number can make the channel buffering number satisfy the maximum channel number $N_b$, that is, the HG 112 sets the forward buffered channel to be started from the channel 15 ($p+u+w_2-N_b-1=16+2+4-8-1=15$). In this manner, the channel section buffered by the HG 112 changes from [14, 16, 22] exceeding the maximum channel number $N_b$ to [15, 16, 22] satisfying the maximum channel number $N_b$.

Then, if the user presses the key to switch to the next channel at the 46$^{th}$ second, it enters the state of "successively channel switching" for the fourth time, so the cumulative switching frequency m is 3 (m=3), and thus, the first trimming numerical value $w_1=1$, the second trimming numerical value is $w_2=8$, and the buffered channel section must be [16, 17, 30]. However, the number of channels contained in the buffered channel section is 15, which exceeds the maximum channel number $N_b$, so the channel section should be adjusted. Since the last buffered channel is larger than the smallest channel buffering number plus the maximum channel buffering number $N_b$ minus 1 ($30=p+u+w_2 > p-h+N_b-1=17-1+8-1=23$), the first processing method is applicable for this circumstance. The forward channel buffering number is set as 1 (the minimum channel number h), and the backward channel buffering number is set as 23 ($p-h+N_b-1=17-1+8-1=23$), so the channel section buffered by the HG 112 is changed to [16, 17, 23].

If the user enters the number 65, the seventh channel-switching request is sent out for switching to the channel 65 at the 48$^{th}$ second (Step 320). The time from the previous channel switching falls within the constant threshold time (Step 331), so the HG 112 again determines that the sixth channel-switching request is different from the seventh channel-switching request (Step 332), and the display channel requested to be delivered by the seventh channel-switching request is the channel 65, but not the neighboring 15 channels, which thus enters the state of "channel jump". Under the state of "channel jump", the HG 112 sets both the first trimming numerical value $w_1$ and the second trimming numerical value $w_2$ as 0 (Step 351), so the channel section [$p-d+w_1$, $p+1$, $p+u+w_2$] buffered by the HG 112 is altered to [63, 65 67] (Step 352).

Additionally, in order to save the bandwidth, in the present invention, after the user stays at one channel for longer than a dwell time $t_{cz}$, the HG 112 may increase the first trimming numerical value $w_1$ according to a third trimming rule, and decrease the second trimming numerical value $w_2$ according a fourth trimming rule, so as to reduce the channel section [$p-d+w_1$, $p+u+w_2$]. For example, in this embodiment, the third trimming rule is fixed as $w_1=w_1+1$, and the fourth trimming rule is fixed as $w_2=w_2-1$. If the dwell time is set as 60 seconds by the HG 112, when the user switches the played channel to the channel 65 at the 48$^{th}$ second, if the user does not press any key to switch the channel in 60 seconds calculated from the 48$^{th}$ second, upon reaching the 108$^{th}$ second, the HG 112 sets the first trimming numerical value $w_1$ as 1 ($w_1=0+1=1$) according to the third trimming rule, and sets the second trimming numerical value $w_2$ as −1 ($w_2=0-1=-1$) according to the fourth trimming rule, such that the channel section [$p-d+w_1$, p, $p+u+w_2$] downloaded by the HG 112 is changed from [63, 65, 67] to [64, 65, 66], and the display channel p is still the channel 65, without being changed.

When the buffered channel section is reduced, it is still necessary to guarantee the forward channel buffering number and the backward channel buffering number larger than or equal to the minimum channel number h. When the user does not switch the channel from the 108$^{th}$ second to the 168$^{th}$ second, the HG 112 would try to reduce the buffered channel section. However, at this time, since the forward channel buffering number and the backward channel buffering number are both equal to 1 (the minimum channel number h), the HG 112 can not reduce the channel section any more, and thus the channel section is still maintained to be [64, 65, 66].

If the user presses the key again to switch backward for one channel at the $170^{th}$ second (Step 320), the time from the previous channel switching is 122 seconds, which is larger than the constant threshold time (Step 331), which thus enters the state of "non-successive channel switching". The HG 112 sets both the first trimming numerical value $w_1$ and the second trimming numerical value $w_2$ as 0 (Step 351), such that the channel section [p−d+$w_1$, p, p+u+$w_2$] buffered by the HG 112 is altered to [64, 66, 68] (Step 352).

Furthermore, the channel registration method for dynamically altering the channel number of the IPTV of the present invention is applicable for being implemented in hardware, software, or assembly of hardware and software, and being implemented in one computer system by means of being concentrated, or distributed in several interconnected computer systems as different elements, which is achieved by means of distribution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A channel buffeting method for dynamically altering a channel buffeting number of an Internet protocol television (IPTV), applicable for a home gateway (HG) capable of handling concurrent requests from a plurality of set-top boxes (STB), comprising:
   a. setting a first channel buffering number d, a second channel buffering number u, a display channel p, and a constant threshold time $t_1$, and then setting a channel section as p−d to p+u ([p−d, p+u]);
   b. receiving two consecutive channel-switching requests from at least one of the plurality of STB; and if a time interval for receiving the two consecutive channel-switching requests is smaller than or equal to the constant threshold time $t_c$, and if it is determined that the two channel-switching requests are both directed to switching a channel towards a same direction, setting a cumulative switching frequency;
   c. setting a first trimming numerical value $w_1$ or a second trimming numerical value $w_2$ according to the cumulative switching frequency; and
   d. altering the channel section as p−d+$w_1$ to p+u+$w_2$ ([p−d+$w_1$, p+u+$w_2$]), and buffering a plurality of channels contained in the channel section.

2. The channel buffering method as claimed in claim 1, wherein in Step a, the first channel buffering number d is equal to the second channel buffering number u.

3. The channel buffering method as claimed in claim 1, wherein in Step d, further comprises:
   e1. delivering a connection request to a last hop router (LHR) by the HG; and
   e2. multicasting each channel to the HG by the LHR.

4. The channel buffering method as claimed in claim 1, wherein in Step b, if the time interval for receiving the first channel-switching request and receiving the second channel-switching request is larger than the constant threshold time, Step c and Step d are performed.

5. The channel buffering method as claimed in claim 1, wherein in Step b, if it is determined that the first channel-switching request and the second channel-switching request are directed to switching a channel towards opposite directions, Step d is performed.

6. The channel buffering method as claimed in claim 1, wherein in Step b, if the second channel-switching request does not request to switch a channel forward or backward, Step c and Step d are performed.

7. The channel registration method as claimed in claim 1, wherein Step d further comprises increasing the first trimming numerical value $w_1$ or decreasing the second trimming numerical value $w_2$ to make the channel number of the channel section be equal to a simultaneously download channel number $N_b$, if it is determined that the channel number of the channel section is larger than the simultaneously download channel number $N_b$.

8. The channel registration method as claimed in claim 1, further comprising calculating a time duration after receiving the first channel-switching request, and reducing the channel section if the time duration is equal to a predetermined value.

9. A channel buffering method for dynamically altering a channel buffering number of an Internet protocol television (IPTV), applicable for a home gateway (HG), comprising:
   a. setting a first channel buffering number d, a second channel buffering number u, a display channel p, and a constant threshold time $t_c$, and then setting a channel section as p−d to p+u ([p−d, p+u]);
   b. receiving two consecutive channel-switching requests; and if a time interval for receiving the two consecutive channel-switching requests is smaller than or equal to the constant threshold time $t_c$, and if it is determined that the two channel-switching requests are both directed to switching a channel towards a same direction, setting a cumulative switching frequency;
   c. setting a first trimming numerical value $w_1$ or a second trimming numerical value $w_2$ according to the cumulative switching frequency;
   d. altering the channel section as p−d+$w_1$ to p+u+$w_2$ ([p−d+$w_1$, p+u+$w_2$]), and buffering a plurality of channels contained in the channel section;
   e. after the IPTV sends out a channel-switching request, calculating a delay time $t_z$ delivered from the HG sends out the request and an IPTV headend transmits the channel to HG via a channel corresponding to the channel-switching request;
   f. calculating an average time $t_{si}$ from the moment the IPTV sends out a channel-switching request to receive the requested channel already buffered in HG;
   g. setting a recommended maximum channel number $U_b$ as a result of dividing the delay time $t_z$ by the average time $t_{si}$; and
   h. if it is determined that the channel number in the channel section is larger than the recommended maximum channel number $U_b$, adjusting the channel section to make the channel number in the channel section be equal to the recommended maximum channel number $U_b$.

10. The channel buffering method as claimed in claim 9, wherein in Step a, the first channel buffering number d is equal to the second channel buffering number u.

11. The channel buffering method as claimed in claim 9, wherein in Step d, further comprises:
   e1. delivering a connection request to a last hop router (LHR) by the HG; and
   e2. multicasting each channel to the HG by the LHR.

12. The channel buffering method as claimed in claim 9, wherein in Step b, if the time interval for receiving the first channel-switching request and receiving the second channel-switching request is larger than the constant threshold time, Step c and Step d are performed.

13. The channel buffering method as claimed in claim 9, wherein in Step b, if it is determined that the first channel-switching request and the second channel-switching request are directed to switching a channel towards opposite directions, Step d is performed.

14. The channel buffering method as claimed in claim 9, wherein in Step b, if the second channel-switching request does not request to switch a channel forward or backward, Step c and Step d are performed.

15. The channel registration method as claimed in claim 9, wherein Step d further comprises increasing the first trimming numerical value $w_1$ or decreasing the second trimming numerical value $w_2$ to make the channel number of the channel section be equal to a simultaneously download channel number $N_b$, if it is determined that the channel number of the channel section is larger than the simultaneously download channel number $N_b$.

16. The channel registration method as claimed in claim 9, further comprising calculating a time duration after receiving the first channel-switching request, and reducing the channel section if the time duration is equal to a predetermined value.

* * * * *

UNITED STATES PATENT AND TRADEMARK OFFICE
CERTIFICATE OF CORRECTION

PATENT NO. : 7,890,983 B2  
APPLICATION NO. : 11/810830  
DATED : February 15, 2011  
INVENTOR(S) : Chen et al.

Page 1 of 1

It is certified that error appears in the above-identified patent and that said Letters Patent is hereby corrected as shown below:

In the Specification

In Column 7, Line 60, delete "display." and insert -- display --, therefor.

In Column 8, Line 53, delete "$t_{si}$ ($t_2$" and insert -- $t_{si}$ ($t_z$ --, therefor.

In Column 9, Line 6, delete "(p+u+w2)" and insert -- (p+u+$w_2$) --, therefor.

In the Claims

In Column 11, Line 29, in Claim 1, delete "buffeting" and insert -- buffering --, therefor.

In Column 11, Line 30, in Claim 1, delete "buffeting" and insert -- buffering --, therefor.

In Column 12, Line 8, in Claim 7, delete "registration" and insert -- buffering --, therefor.

In Column 12, Line 16, in Claim 8, delete "registration" and insert -- buffering --, therefor.

In Column 13, Line 12, in Claim 15, delete "registration" and insert -- buffering --, therefor.

In Column 14, Line 8, in Claim 16, delete "registration" and insert -- buffering --, therefor.

Signed and Sealed this  
Second Day of December, 2014

Michelle K. Lee  
*Deputy Director of the United States Patent and Trademark Office*